(12) United States Patent
Cho et al.

(10) Patent No.: US 11,679,453 B2
(45) Date of Patent: Jun. 20, 2023

(54) FILLER METAL FOR TIG WELDING

(71) Applicant: PUKYONG NATIONAL UNIVERSITY INDUSTRY-UNIVERSITY COOPERATION FOUNDATION, Busan (KR)

(72) Inventors: Sang-Myung Cho, Busan (KR); Dong-Soo Oh, Gyeong-sangnam-do (KR); Hyo-Sik Ham, Busan (KR); Hyeon-Joo Ha, Busan (KR); Hee-Seop Shin, Busan (KR); Jae-Ho Jun, Busan (KR); Jae-Gyu Byun, Busan (KR); Jung-Hyun Park, Busan (KR); Hyuk-Yong Kwon, Gyeong-sangbuk-do (KR)

(73) Assignee: PUKYONG NATIONAL INDUSTRY-UNIVERSIT COOPERATION FOUNDATION, Busan (KR)

( * ) Notice: Subject to any disclaimer, the term of this patent is extended or adjusted under 35 U.S.C. 154(b) by 278 days.

(21) Appl. No.: 16/898,937

(22) Filed: Jun. 11, 2020

(65) Prior Publication Data
US 2020/0298348 A1 Sep. 24, 2020

Related U.S. Application Data

(63) Continuation of application No. 14/912,899, filed as application No. PCT/KR2013/011116 on Dec. 3, 2013, now abandoned.

(30) Foreign Application Priority Data

Aug. 20, 2013 (KR) ........................ 10-2013-0098314

(51) Int. Cl.
*B23K 35/02* (2006.01)
*B23K 9/167* (2006.01)

(52) U.S. Cl.
CPC .......... *B23K 35/0277* (2013.01); *B23K 9/167* (2013.01); *B23K 35/02* (2013.01)

(58) Field of Classification Search
CPC .... B23K 9/167; B23K 35/02; B23K 35/0255; B23K 35/0261; B23K 35/0277
See application file for complete search history.

(56) References Cited

U.S. PATENT DOCUMENTS 5,220,246 A * 6/1993 Ide ........................ H04R 23/004
315/358
2001/0030004 A1 * 10/2001 Kushida ................... B23K 9/23
148/325

(Continued)

*Primary Examiner* — Brian W Jennison
(74) *Attorney, Agent, or Firm* — Han's Law Office

(57) ABSTRACT

The present invention provide a filler metal for TIG welding capable of stable welding, of which heat flux feeding area is wider than conventional wire filler metal and heat input per unit length is increased. The filler metal for TIG welding which is continuously supplied on a base metal to be melted by an arc after forming the arc between the base metal and an electrode over the base metal and supplying shield gas around the arc, wherein the cross-section of the filler metal has curved shape of which surface facing the electrode is concavely curved to the electrode.

6 Claims, 15 Drawing Sheets

(56) References Cited

U.S. PATENT DOCUMENTS

| | | | | |
|---|---|---|---|---|
| 2012/0298629 A1* | 11/2012 | Cooper | ................ | B23K 9/295 |
| | | | | 219/74 |
| 2014/0008344 A1* | 1/2014 | Enyedy | ............. | B23K 35/0283 |
| | | | | 219/145.1 |
| 2014/0042131 A1* | 2/2014 | Ash | ..................... | B23K 26/211 |
| | | | | 428/576 |

* cited by examiner

| Feeding speed(cpm) | Bead outward appearance | Remark |
|---|---|---|
| 250 |  | |
| 260 |  | |
| 270 |  | |
| 280 |  | |
| 290 |  | |
| 300 |  | Unmelting strip occurrence |

FIG. 13

| Feeding speed | Bead appearance |
|---|---|
| 250 | |
| 260 | |
| 270 | |
| 280 | |
| 290 | |
| 300 | |

| Feeding speed | Bead appearance |
|---|---|
| 310 |  |
| 320 |  |
| 330 |  |
| 340 |  |
| 350 |  |
| 360 |  |
| 380 |  |
| 400 |  |

FIG. 17

| Feeding speed (cpm) | Cross-sectional area of welding (mm²) | Deposition rate (kg/hr) | penetration(mm) | | | | | maximum | minimum | Average |
|---|---|---|---|---|---|---|---|---|---|---|
| | | | 1 | 2 | 3 | 4 | 5 | | | |
| 250 | 19.7 | 3.5 | 1.2 | 1.0 | 1.8 | 2.5 | 2.0 | 2.5 | 1.0 | 1.7 |
| 260 | 20.5 | 3.7 | 0.9 | 1.3 | 1.7 | 1.5 | 1.1 | 1.7 | 0.9 | 1.3 |
| 270 | 21.3 | 3.8 | 0.9 | 1.1 | 2.0 | 1.3 | 0.9 | 2.0 | 0.9 | 1.2 |
| 280 | 22.1 | 3.9 | 0.9 | 1.0 | 1.7 | 2.0 | 1.5 | 2.0 | 0.9 | 1.4 |
| 290 | 22.9 | 4.1 | 1.4 | 1.3 | 1.7 | 2.6 | 2.7 | 2.7 | 1.3 | 1.9 |
| 300 | 23.7 | 4.2 | 1.1 | 1.5 | 2.7 | 2.1 | 1.3 | 2.7 | 1.1 | 1.7 |

Formed Strip

| Formed Strip | Feeding speed (cpm) | Cross-sectional area of welding (mm²) | Deposition rate (kg/hr) | penetration(mm) | | | | | maximum | minimum | Average |
|---|---|---|---|---|---|---|---|---|---|---|---|
| | | | | 1 | 2 | 3 | 4 | 5 | | | |
| | 310 | 24.5 | 4.4 | 1.2 | 1.6 | 1.7 | 1.4 | 0.9 | 1.7 | 0.9 | 1.4 |
| | 320 | 25.3 | 4.5 | 1.2 | 1.3 | 1.5 | 1.7 | 1.4 | 1.7 | 1.2 | 1.4 |
| | 330 | 26.1 | 4.6 | 1.3 | 1.9 | 1.8 | 1.7 | 1.4 | 1.9 | 1.3 | 1.6 |
| | 340 | 26.8 | 4.8 | 1.4 | 1.2 | 2.0 | 1.6 | 1.0 | 2.0 | 1.0 | 1.4 |
| | 350 | 27.6 | 4.9 | 1.1 | 0.9 | 1.5 | 1.3 | 0.9 | 1.5 | 0.9 | 1.1 |
| | 360 | 28.4 | 5.1 | 1.2 | 1.1 | 1.4 | 1.4 | 1.0 | 1.4 | 1.0 | 1.2 |

| Formed Strip | Feeding speed (cpm) | Cross-sectional area of welding (mm²) | Deposition rate (kg/hr) | penetration(mm) | | | | | maximum | minimum | Average |
|---|---|---|---|---|---|---|---|---|---|---|---|
| | | | | 1 | 2 | 3 | 4 | 5 | | | |
| | 380 | 30.0 | 5.3 | 0.9 | 1.3 | 1.5 | 1.3 | 1.1 | 1.5 | 0.9 | 1.2 |
| | 400 | 31.6 | 5.6 | 1.1 | 1.3 | 1.5 | 1.5 | 1.1 | 1.5 | 1.1 | 1.3 |

| No. | penetration(mm) | Height of bead(mm) | No. | penetration(mm) | Height of bead(mm) |
|---|---|---|---|---|---|
| 1 | 1.88 | 0.6 | 16 | 2.6 | 0.5 |
| 2 | 2.2 | 0.5 | 17 | 2.6 | 0.5 |
| 3 | 2.2 | 0.4 | 18 | 2.6 | 0.6 |
| 4 | 2.2 | 0.5 | 19 | 2.4 | 0.6 |
| 5 | 2.2 | 0.5 | 20 | 2.3 | 0.7 |
| 6 | 2.1 | 0.6 | 21 | 2.2 | 0.5 |
| 7 | 2 | 0.7 | 22 | 2 | 0.6 |
| 8 | 1.8 | 0.7 | 23 | 2.2 | 0.8 |
| 9 | 1.9 | 0.8 | 24 | 2.3 | 0.7 |
| 10 | 2 | 0.8 | 25 | 2.3 | 0.66 |
| 11 | 2.2 | 0.8 | 26 | 2.34 | 0.66 |
| 12 | 2.2 | 0.5 | 27 | 2.24 | 0.36 |
| 13 | 2.2 | 0.6 | 28 | 2.14 | 0.66 |
| 14 | 2.3 | 0.6 | Average | 2.22 | 0.61 |
| 15 | 2.5 | 0.5 | Standard deviation | 0.21 | 0.12 |

FILLER METAL FOR TIG WELDING

CROSS-REFERENCE TO RELATED APPLICATIONS

This application is a continuation of U.S. patent application Ser. No. 14/912,899, filed Feb. 18, 2016, which is a U.S. National Phase filing of PCT/KR2013/011116, filed Dec. 3, 2013, which claims the benefit of Korean Application No. 10-2013-0098314, filed Aug. 20, 2013, the entire disclosures of both of which are hereby expressly incorporated by reference herein.

TECHNICAL FIELD

The present invention relates to a filler metal for TIG (Tungsten Inert Gas) welding, and more specifically relates to a filler metal for TIG welding having high welding productivity.

BACKGROUND ART

In general, low-grade material such as carbon steel is mainly used for pipe equipment of electricity facilities, ocean plants or petrochemical plants, and an overlay welding is performed at predetermined thickness using a high stiffness different metal such as stainless steel or nickel alloy having high refractory, endurance and corrosion resistance.

This overlay welding is often referred to a overlay welding. This is a method that a metal surface is coated by welding to improve corrosion resistance, endurance, abrasion resistance and strength when a metal with weak physical characteristics is used in very weakness environment, and is widely used because high mechanical and chemical characteristics can be adjusted with relatively low cost.

The build-up welding as the above is used by developing the variety of automatic apparatuses.

For example, the Korean registered patent No. 909596 relates to an automatic overlay welding apparatus of a long pipe, and comprises a rotation chuck part in which a pipe is inserted and fixed and rotating the pipe; a pair of guide wire penetrating the pipe fixed at the rotation chuck to be placed horizontally in parallel; a tensile part drawing out the guide wire; a welding part supported by the guide wire to be capable of moving along an interior of the pipe, and performing a build-up welding into the interior of the pipe; and a controller managing that the pipe is rotated by the rotation chuck part simultaneously with moving the welding part toward one side to continuously perform the build-up welding while a welding bead is formed as a spiral on an inner surface of the pipe.

Further, the Korean registered patent No. 383014 relates to a hotwire TIG torch, relates to a hotwire TIG torch capable of performing the build-up welding of an inner surface of a pipe with small diameter and long length, and comprises a connection part; body part connecting with the connection part, having appropriate length and having both ends connected with insulator; and an electrode part connected to the body part angularly with the longitudinal direction of the body part, thereby a build-up welding can be available to a pipe having inner diameter of at least 150 mm and an inner build-up welding can be available to the pipe having about 1.5 meter length. Thus this apparatus can be applied to the build-up welding of pipe interior with small diameter and long length.

This build-up welding apparatus disclosed above introduces TIG welding as a welding method.

The TIG welding has advantages that mechanical property and corrosion resistance are superior and working environment is clean, but has a problem of low productivity.

To improve productivity, current should be elevated and welding speed should be increased. If high current is used, however, serious depression phenomenon may be occurred at the surface of welding pool by strong arc power from arc pressure, and welding defects, i.e., undercut, humping bead and separate bead may be generated.

To improve productivity by elevating deposition rate, wire feeding speed should be elevated. However, time enough to absorb arc heat is insufficient when small wire of 1.0 or 1.2 mm is used, and the wire may get out of the welding pool without melting to form an unmelted wire even if the wire is fed by being a little went off the arc center.

Because the productivity is getting lower when the unmelted wire is occurred, the welding is performed at sufficiently high current in a job site.

The current should be elevated when the feed speed is elevated, however, the welding defects such as the undercut may be occurred and the depression of a base metal may be extended by the strong arc power. Thus, there is a shortcoming that application is difficult.

As a formation to overcome the above shortcoming, a Korean patent application No. 2012-0096720, which is filed by present applicant may be exemplified.

The above patent introduces that a filler metal having planar shaped cross-section is applied to the TIG welding, thereby having advantage of high welding speed in compare with conventional wire shape.

However, because the above patent restricts rectangular planar shaped cross-section, there is some room for further improvement that a portion of cross-section shape may be changed to new shaped cross-section of filler metal showing higher production speed.

DISCLOSURE

Technical Problem

The object of the present invention is to provide a filler metal for TIG welding capable of stable welding, of which heat flux feeding area is wider than conventional wire filler metal and heat input per unit length is increased.

Technical Solution

The present invention provides a filler metal for a TIG welding which is continuously supplied on a base metal to be melted by an arc after forming the arc between the base metal and an electrode over the base metal and supplying shield gas around the arc. The cross-section of the filler metal has curved shape of which surface facing the electrode is concavely curved to the electrode.

In some embodiments, the cross-section of the filler metal may be a shape that a plane board represented by width and thickness is concavely curved to the electrode.

In other embodiments, the cross-section of the filler metal may be symmetrical with respect to the vertical line of the base metal.

In still other embodiments, the cross-section of the filler metal may have a lower portion of 3rd spline curve.

In yet other embodiments, the cross-section of the filler metal may have a lower portion of arc.

In yet still other embodiments, the cross-section of the filler metal may have a lower portion of parabola.

In further embodiments, the cross-section of the filler metal may have a lower portion of which both ends beside a contacting portion with the base metal are inclined lines.

In still further embodiments, the cross-section of the filler metal may include a central plane board disposed in horizontal and an inclined plane board beside an end of the central plane board.

In yet further embodiments, the central plane board is thicker than inclined plane board.

In yet still further embodiments, the central plane board may be 1.1 through 2 times of the inclined plane board in thickness.

In other embodiments of the inventive concept, the central plane board may further include a bent portion.

In still other embodiments, the width may be 3 mm through 10 mm and the thickness may be 0.3 through 1 mm.

In yet other embodiments, the filler metal may be formed of stainless steel.

In yet still other embodiments, the filler metal may be formed of at least one selected from sus300 group, alloy 625, duplex sts2209 and super duplex.

Advantageous Effects

The filler metal for the TIG welding according to the present invention is formed of relative large cross-sectional shape which is concavely curved to the electrode in contrast to conventional circular filler metal such that heat flux transmitted from the electrode are widely absorbed to increase heat input, thereby high productivity and stable welding can be provided even if welding current is relatively low and feeding speed of the filler metal is slow.

DESCRIPTION OF DRAWINGS

FIG. 13 is a photograph of beads in an example embodiment.

FIG. 17 is a photograph of beads cross-sections in an example embodiment.

MODE FOR INVENTION

Figure 1:
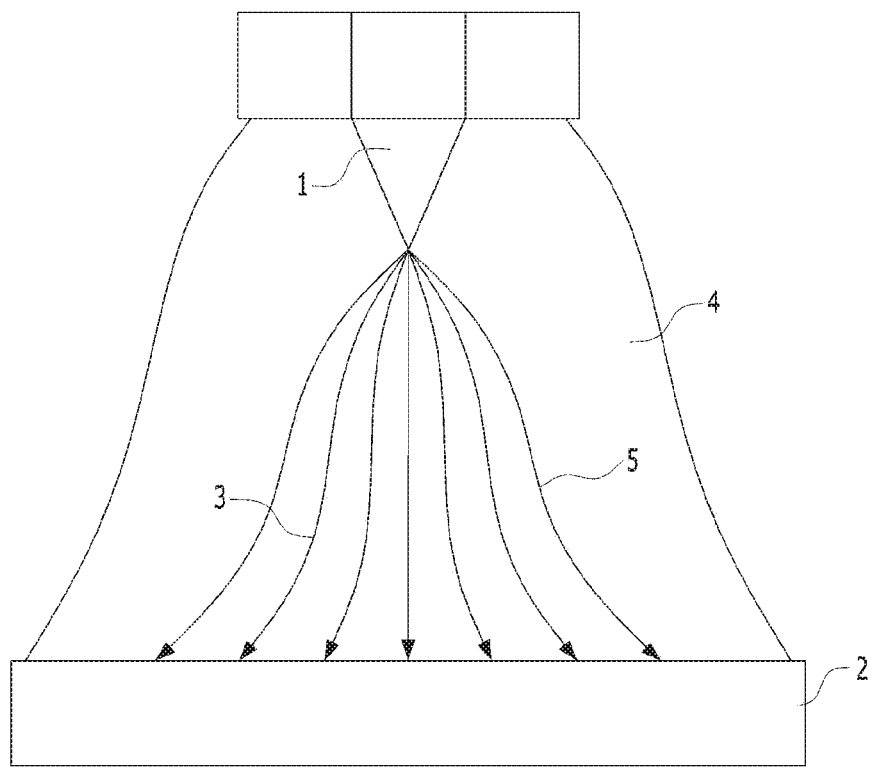
FIG. 1 illustrates a conventional TIG welding apparatus.

Embodiments of the present invention will now be described more fully hereinafter with reference to the accompanying drawings.

The feature of the filler metal 10 for the TIG welding according to the present invention is that the cross-sectional shape is defined to obtain heat amount into the filler metal 10 in the TIG arc plasma.

First of all, the TIG welding is modeled by an electrode 1, a base metal 2, arc formed between the electrode 1 and a base metal 2, and shield gas supplied around the arc 3.

Although the arc 3 starts from one point of the electrode 1 to form a predetermined width on the base metal 2, an expression for an interior of the arc 3 is also important because the interior also transmits energy.

The interior of the arc 3 may be expressed by plasma stream 5 which is location function.

The outline of the plasma stream 5 corresponds to shape of the arc 3.

The plane of the arc 3 is defined as a circle.

Thus, the arc 3 of FIG. 1 is defined as an axisymmetric shape.

In addition, it is defined that input heat into the filler metal 10 by the arc 3 is highest when the filler metal 10 is disposed to a direction of normal line of the plasma stream 5 in the foregoing arc 3, and the cross-section shape of the filler metal 10 is determined by calculating a normal plane of the plasma stream 5 in the present invention.

The shape of the arc 3 is assumed that pressure distribution or heat flux distribution formed at the plane near the base metal 2 by the plasma stream in the arc 3 has the Gaussian distribution form, probability of general natural phenomenon has usually Gaussian distribution, and the arc 3 in the TIG 30 welding is appropriately assumed when distribution feature spreading from the electrode 1 to the base metal is considered.

Thus the shape f(r) of the arc 3 is defined as follows.

$$f(r) = f(0)e^{-\left(\frac{r^2}{2\sigma^2}\right)} \qquad \text{[Equation 1]}$$

Here, r is distance along a radius direction when the electrode 1 is assumed to the center, f(0) is vertical distance from the electrode 1 to the base metal 2, i.e., length of the arc 3, σ means variance, and the σ value is selected in accordance with the distance along the radius direction.

Figure 2:
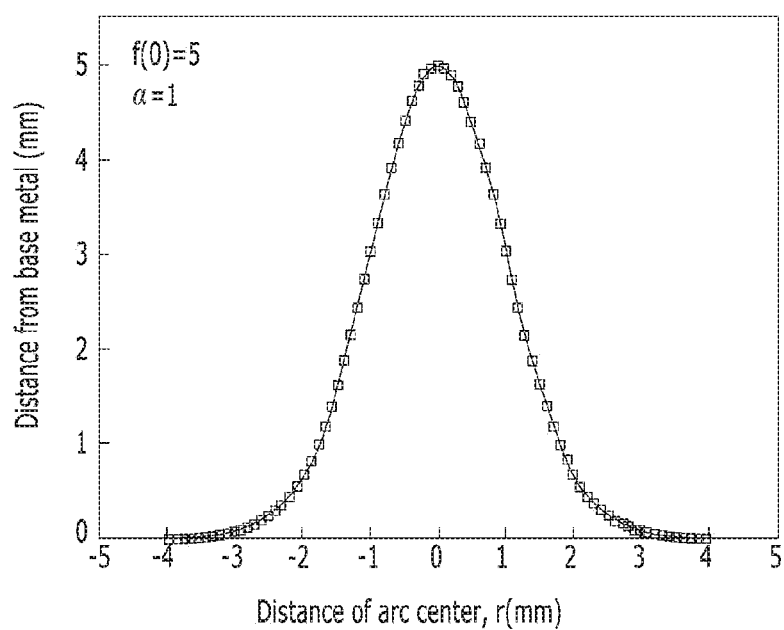
FIG. 2 is a graph illustrating arc phenomenon occurred in FIG. 1.

FIG. 2 is graph illustrating the shape of the arc 3 when σ=1, f(0)=5.

In addition, although f(0) is selected followed by adjusting σ to select r value on the basis of a point where the plasma stream 5 is in contact with the base metal 2, there is disadvantage that r value cannot be selected since the plasma stream 5 is converged without contacting on the base metal caused by characteristic of Gaussian distribution.

Therefore, the present invention solves these problems by adding 10% length of arc 3 to form the plasma stream 5, and selecting r on the basis of a point joining with real length of the arc 3.

The modification to the length of arc 3 may be selected appropriately in ±10%.

Figure 3:
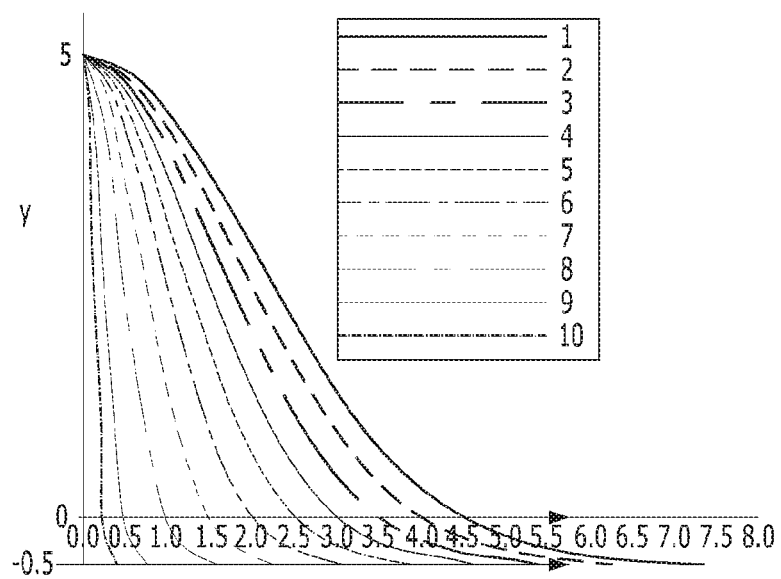
FIG. 3 is a graph illustrating a plasma stream curve on the basis of the arc of FIG. 2.

FIG. 3 is a drawing illustrating ten plasma streams 5 of which r value is increased by 0.5 from initial 0.25 when the arc length of 5 is assumed as 5.5 to form the plasma stream 5 followed by determining intersection value of the plasma stream 5 at the 0 point as r.

Figure 4:
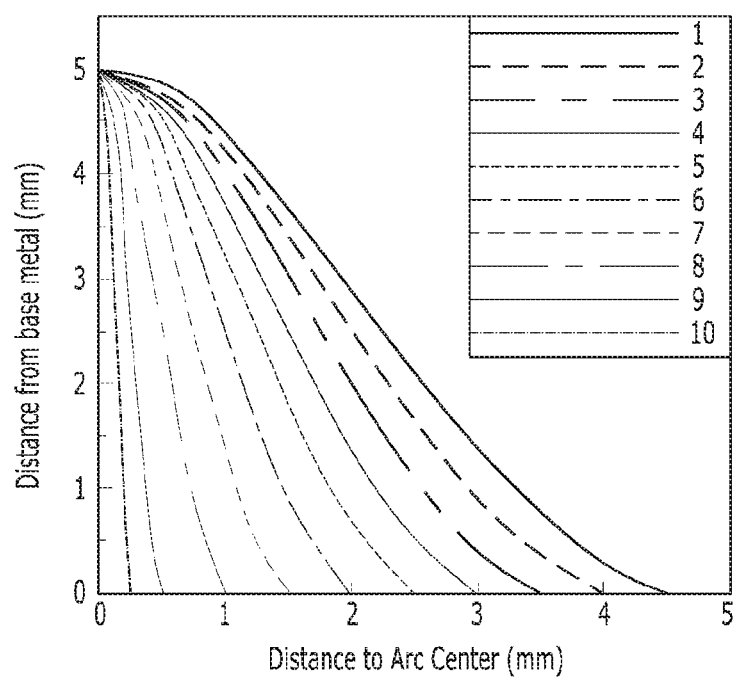
FIG. 4 illustrates a portion of the stream curves shown in FIG. 3.

FIG. 4 is a drawing illustrating the plasma stream 5 after removing bottom 0.5 of the arc length.

A normal line is calculated at a cross point Where an x-axis intersects with the plasma stream 5 adjacent to the center in the path of each plasma stream 5, i.e., the point where y value is zero (or constant value), a cross point of the plasma stream 5 adjacent to the normal line, and a normal line of the plasma stream 5 is obtained at the cross point simultaneously with obtaining a tangent line of each plasma stream 5, thereby a curve connecting normal lines of the plasma stream 5 can be obtained.

Figure 5:
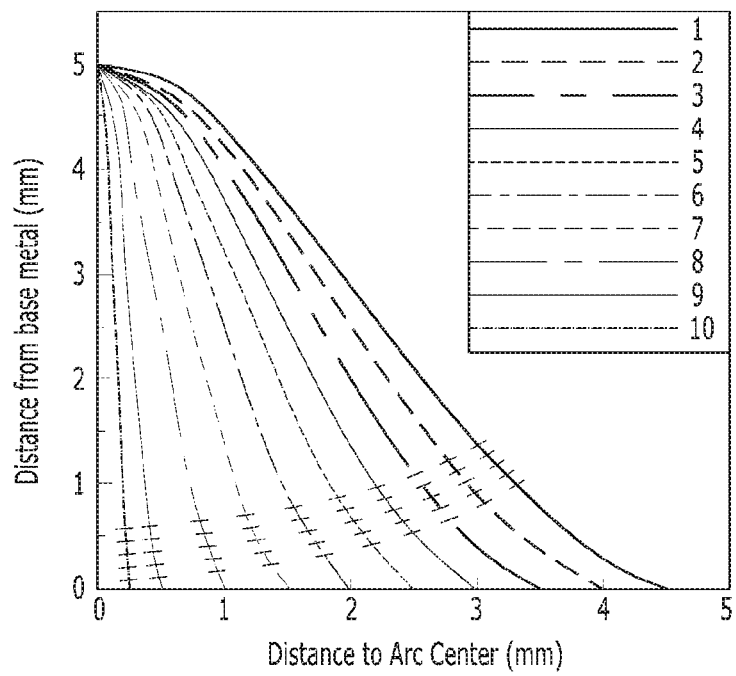
FIG. 5 illustrates normal lines drawn at a predetermined length of the stream shown in FIG. 3.

FIG. 5 is a drawing illustrating normal lines after determining the plasma stream 5 at ten and obtaining the cross point using the normal line. As depicted in FIG. 5, each of a plurality of line segments represented by normal lines is formed at each of a plurality of plasma streams. The each of the plurality of line segments is normal to a corresponding one of the plurality of plasma streams.

Figure 6:
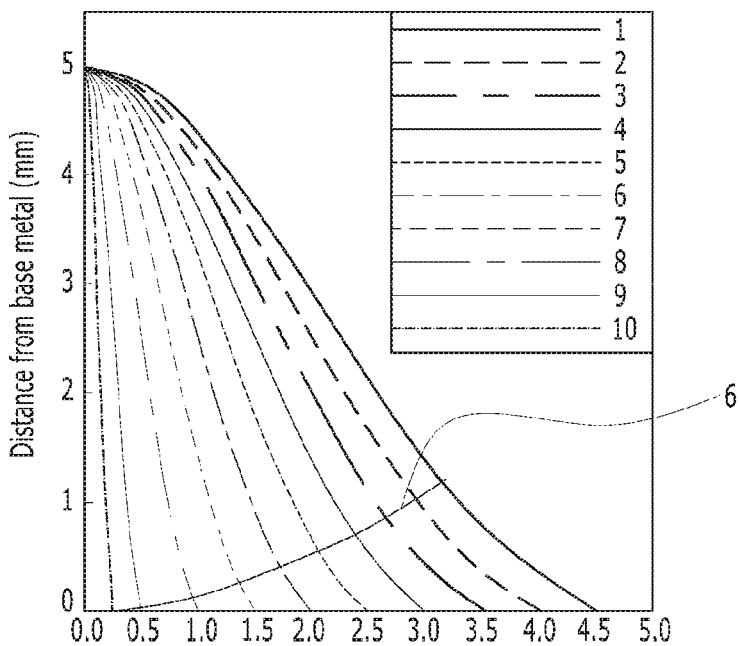
FIG. 6 illustrates a cross-section line connecting the normal lines shown in FIG. 5.

The curve 6 of FIG. 6 may be obtained continuously connecting points of normal lines of plasma streams 5 from FIG. 5.

In basis that the highest energy absorption rate is shown when the plasma collides to the filler matter at 90 degree, the curve 6 shows the highest energy absorption rate.

Figure 7:
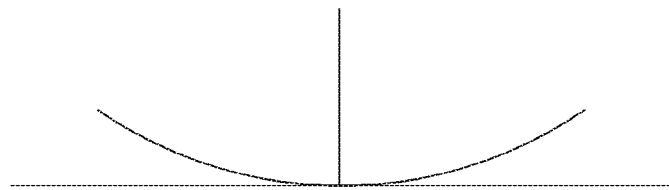
FIG. 7 illustrates a complete cross-section line of FIG. 5.

Since the curve 6 is symmetric, actually, the cross-sectional curve 7 as shown in FIG. 7 shows the highest heat input with respect to the arc 3.

Since entire arc 3 instantaneously generated through the electrode 1 is adsorbed vertically into the cross-sectional curve 7 in uniform, the highest heat input is shown theoretically.

Though the filler matter 10 of the same the cross-section as the cross-sectional curve 7 shows the highest heat input, it is difficult to form the curve practically because the curve is expressed by a complex equation. Thus, simplicity is implemented to form a shape having increased heat input.

Figure 8:
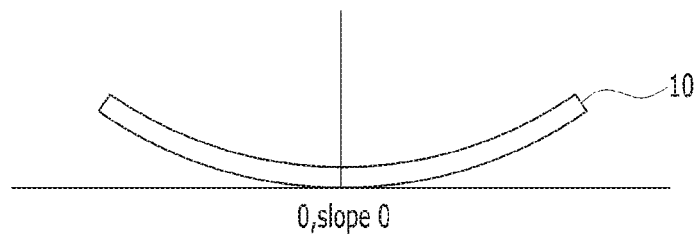
FIG. 8 illustrates another embodiment of FIG. 6.

As shown in FIG. 8, the cross-section of the filler metal 10 is defined as third spline curve of which the cross-section is on the basis of rectangular plane board, the center of the lower surface of the cross-section is located at the center of the arc 3, tangent of the center of the lower surface is zero and an end portion has a predetermined height.

Here, width of the rectangular plane board may be 3 mm through 10 mm, and thickness may be 0.3 through 1 mm.

If the width of the plane board is in less than 3 mm, there is a problem in productivity. If the width of the plane board is in excess than 10 mm, there is a problem in melting. If the filler metal 10 does not correspond exactly with the electrode 1, partially unwelding may be occurred.

In addition, if the thickness of the plane board is in less than 0.3 mm, there is also some problem in productivity. And if the thickness of the plane board is in excess than 1 mm, there is some problem in melting.

Every material used in conventional TIG welding may be used as the filler metal 10.

For example, stainless steel, sus300 group, alloy625, duplex sts2209, super duplex, and etc. may be applicable.

In addition, characteristic of the cross-sectional curve can be sufficiently reflected when the cross-sectional curve 7 is defined as foregoing third spline curve.

Figure 9:
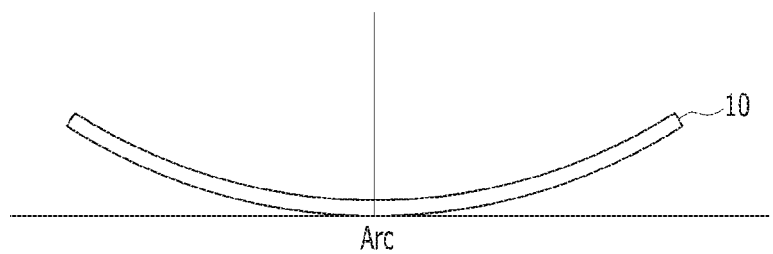
FIG. 9 illustrates another embodiment of FIG. 6.

As shown in FIG. 9, the cross-section of the filler metal 10 may be formed as an arc shape.

The cross-section may be similar with the cross-section curve 7 and may be formed by bending a portion of a plane board, thereby higher heat input is shown in compare with a filler metal 100 of circular or plane shape.

In addition, secondary parabolic curve with the center at the original may be composed.

As shown in FIG. 10(a), bent plane shape may be composed.

The above cross-section is partially different from the cross-sectional curve 7, however, high heat input is shown at an end of the filler metal 10, and thereby appropriate heat input can be expected.

As shown in FIG. 10(b), center is plane shape and inclined planes are formed at both ends of the plane.

This shape has disadvantage in heat input, however, there is advantage in filler metal 10 feeding and location under the electrode 1.

The cross-section of FIG. 10(b) may be composed by making difference in thickness of the center plane and the inclined plane. Since heat input of the center portion of the plane is higher, the center portion may be thicker than the inclined plane. It is preferable to form thickness of the center plane at 1.1 times through 2 times of the inclined plane.

In less than 1.1 times, there is no particular effect. And, in excess than 2 times, unwelding may be occurred at center portion.

Figure 10:
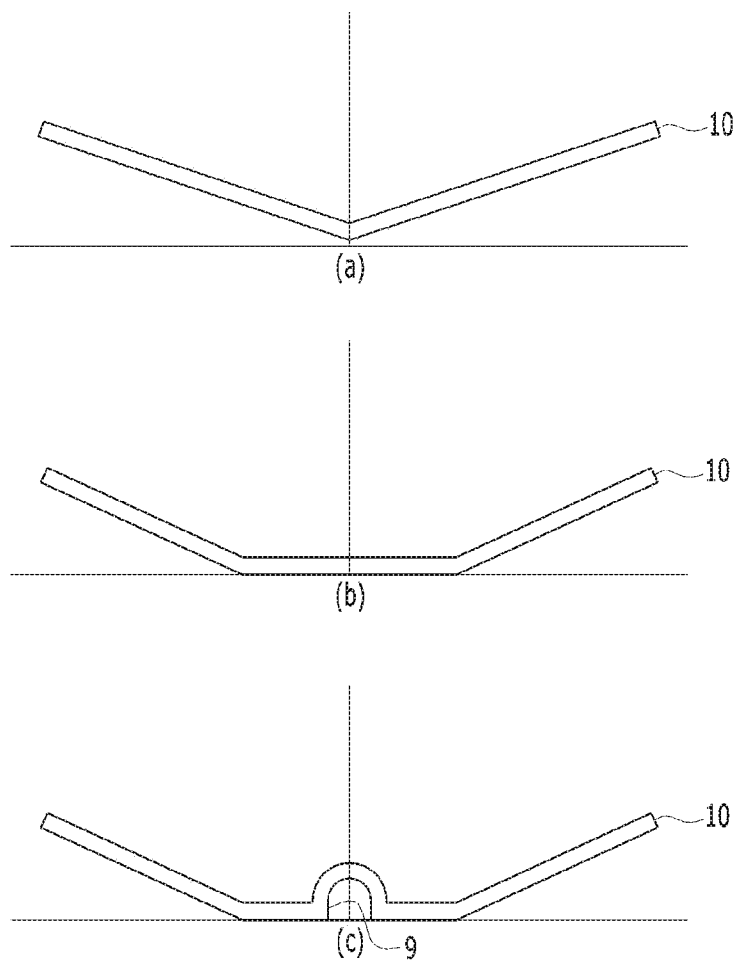
FIG. 10 illustrates other embodiments of FIG. 6.
Figure 11:
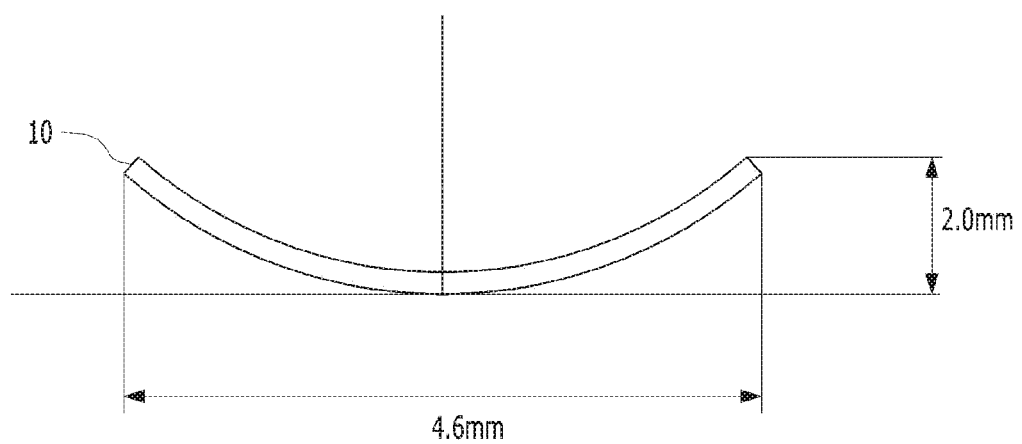
FIG. 11 illustrates cross-sectional length of a filler metal applied to embodiments.

As shown in FIG. 10, the cross-section of the filler metal 9 may be formed having a bent portion 9.

The bent portion 9 may be used for the filler metal feeding and guiding.

If the cross-sectional shape of the filler metal 10 is concavely formed to the electrode 1 on the basis of plane, the heat input is higher than conventional filler metal having circular cross-sectional shape and higher than planar shape.

The cross-section of the tiller metal 10 may be not on the basis of plane, may be formed concavely on the basis of the electrode 1, and may be formed asymmetrically in this case.

The present invention will now be described more fully hereinafter n the basis of embodiments.

Example Embodiment

A planar filler metal 10 of sus303 material having cross-section width of 5 mm and cross-section thickness of 0.6 mm was bent to form as tertiary curve of 4.6 mm width and 1.7 mm height, and then TIG welding is performed.

The material of the base metal was SS400, welding speed was 38 cpm (cm/min), current was 360 A and length of the arc was set up at 7 mm.

Welding was implemented while feeding speed was increasing by 10 cpm, from 250 cpm to 400 cpm. Deposition rate per unit time is determined in accordance with the feed speed, i.e., 250 cpm then 3.51 kg/hr and 400 cpm then 5.6 kg/hr. Median feed speed can be calculated by interpolation.

Comparative Embodiment

TIG welding was implemented using a filler metal 10 of sus304 material having cross-sectional width of 5 mm and thickness of 0.6 mm in the same condition as the example embodiment.

Feeding speed of the filler metal 10 was increasing by 10 cpm, from 250 cpm to 300 cpm.

Test Embodiment 1 (Analyzing of Bead Outward Appearance)

Analysis was conducted to the example embodiment and the comparative embodiment.

Figure 12:
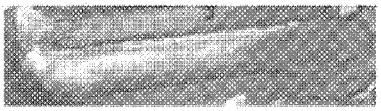
FIG. 12 is a photograph of beads in a comparative embodiment.
Figure 12:
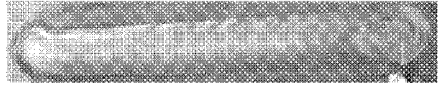
Figure 12:
Figure 12:
Figure 12:
Figure 12:
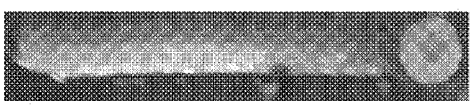

FIG. 12 shows photographs of beads outward appearance according to each feed speed in the comparative embodiment. When the feed speed was over 290 cpm, unwelding was occurred.

Figure 13:
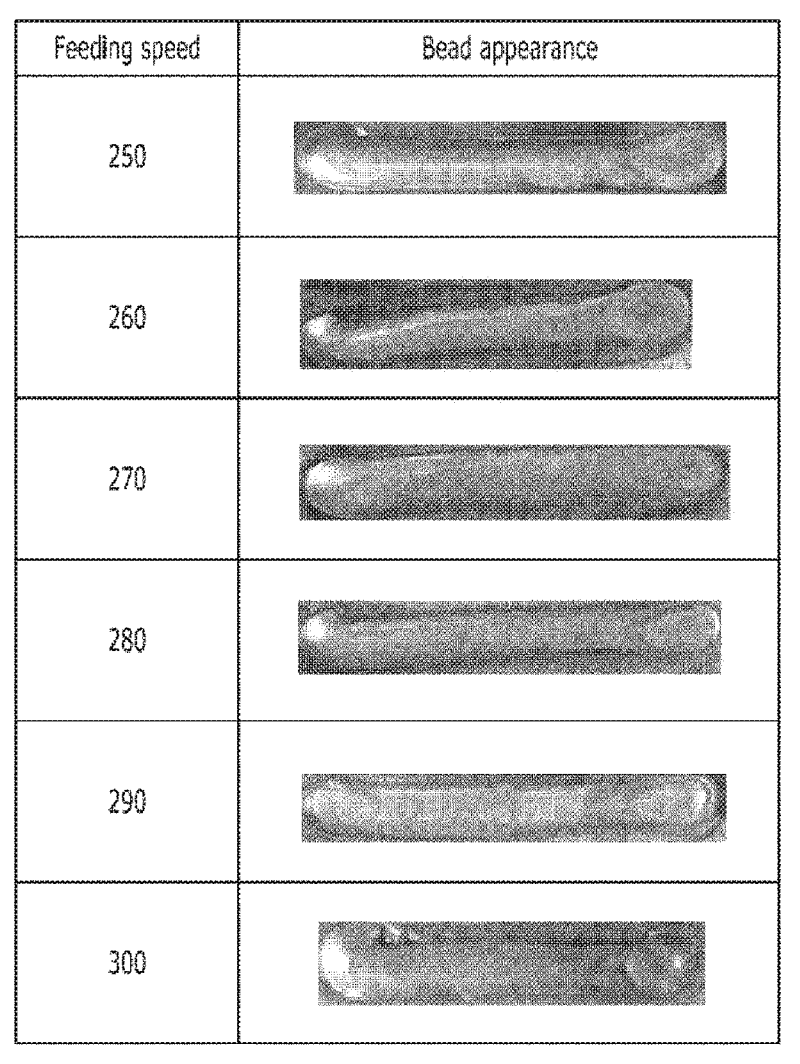
Figure 14:
FIG. 14 is a photograph of other beads in an example embodiment.
Figure 14:
Figure 14:
Figure 14:
Figure 14:
Figure 14:
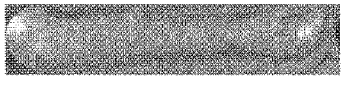
Figure 14:
Figure 14:

FIG. 13 and FIG. 14 shows photographs of heads outward appearance according to each feed speed in the example embodiment. Satisfactory beads was formed without unwelding until 400 cpm.

Test Embodiment 2 (Analyzing of Bead Cross-Section)

Analysis was conducted to beads formed by the example embodiment and the comparative embodiment.

Figure 15:
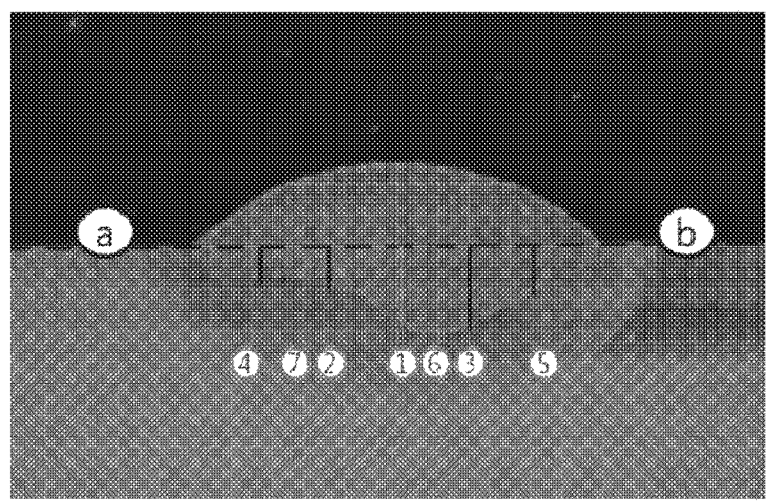
FIG. 15 is illustration to analyze the cross-section.

As shown in FIG. 15, the cross-section of the bead was analyzed by connecting a line between two points ⓐ-ⓑ at the surface of the base metal 2 and then measuring welding depth at the center (① site).

And, additional two measurements are conducted at 2 mm intervals toward both sides of the center (②, ③, ④ and ⑤ sites).

After calculating mean value of the five welding depth, the maximum and the minimum welding depths are measured (⑥ and ⑦ sites).

Figure 16:
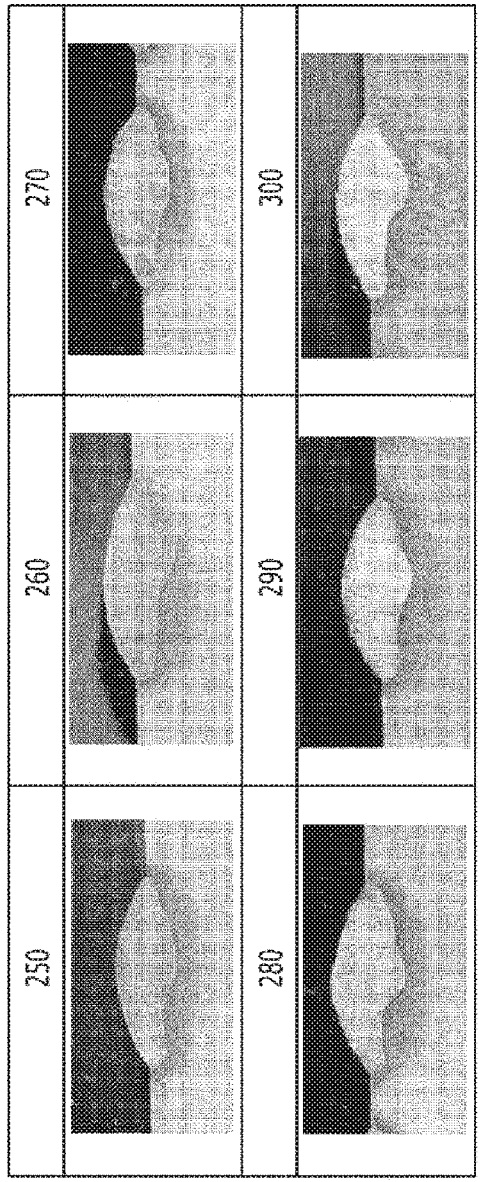
FIG. 16 is a photograph of bead cross-sections in a comparative embodiment.
Figure 18:
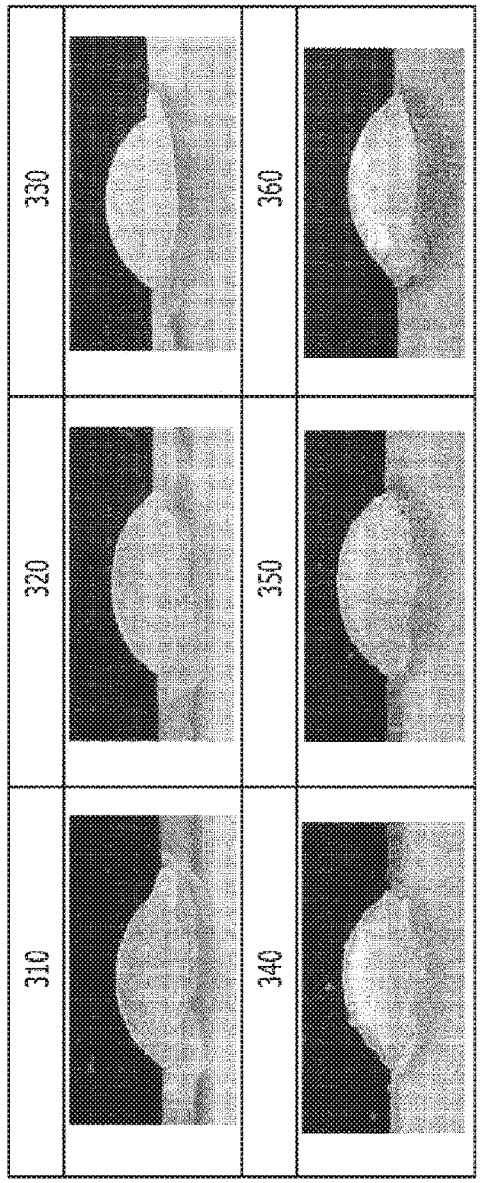
FIG. 18 is a photograph of other bead cross-sections in an example embodiment.
Figure 19:
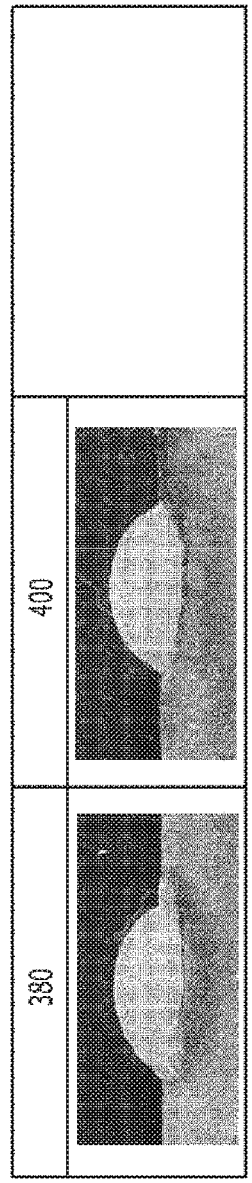
FIG. 19 is a photograph of other bead cross-sections in an example embodiment.

FIG. 16 illustrates cross-section shapes of beads according to the comparative embodiment and welding depth data of cross-sections of the beads.

From the data, it was confirmed that the example embodiment was shown welding quality approaching the comparative embodiment.

Test Embodiment 3 (Maximum Welding Speed)

If welding speed is calculated using the test embodiment 1 and the test embodiment 2, the example embodiment showed 5.6 kg/hr but the comparative embodiment showed 3.9 kg/hr. Thus, the filler metal of the example embodiment showed superior productivity in comparison with the comparative embodiment and showed similar welding quality as confirmed in the test embodiment 2.

Test Embodiment 3 (Test of Forming Multi-Bead)

Six layered bead was formed using the cross-section of the filler metal 10 of the example embodiment followed by analyzing characteristic of cross-section.

In this case, welding condition was that material was SS400, welding speed was 38 cpm (cm/min), current was 360 A, length of the arc was set up at 7 mm, and material of the filler metal 10 was STS304, feed speed was 360 cpm, welding area was 20 mm2, welding speed was 5.02 kg/hr, and torch weaving interval was 3 Hz and weaving length was 5 mm.

Figure 20:
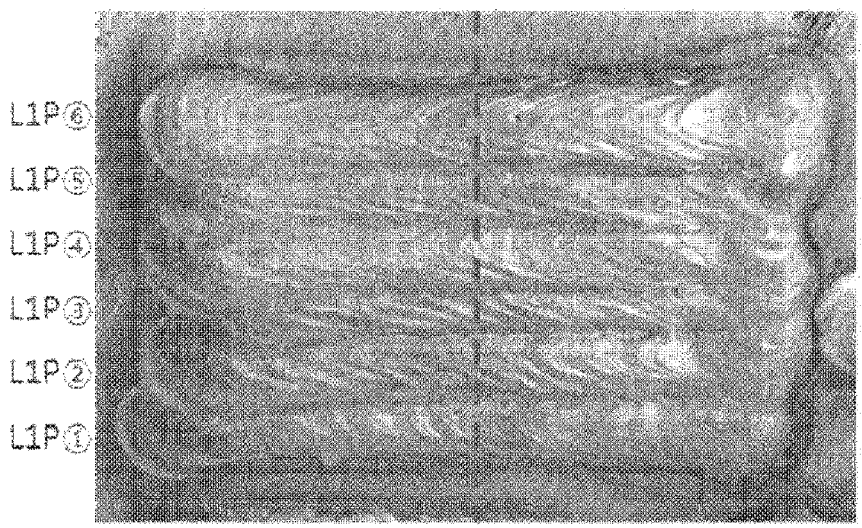
FIG. 20 illustrates bead shapes according to a test embodiment 4.
Figure 21:
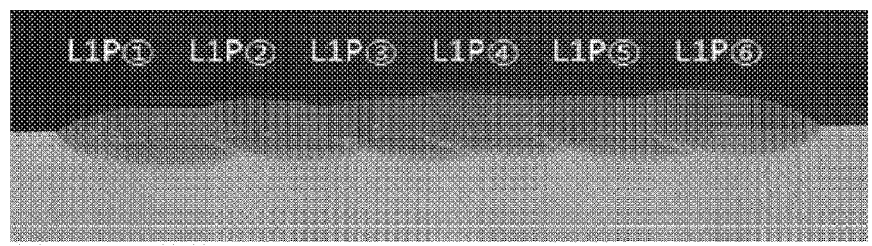
FIG. 21 is bead cross-sections of FIG. 20 and data of welding depth and bead height according to the cross-sections.

FIG. 20 is shape of the bead, and FIG. 21 is a photograph showing cross-section of the bead and data regarding to bead height and welding depth at fifteen sites. FIGS. 21 and 22 shows that the bead was uniformly formed.

The present invention was illustrated and described with reference to exemplary embodiments. It should be noted, however, that the inventive concepts are not limited to the exemplary embodiments, and the exemplary embodiments are provided only to disclose the inventive concepts and let those skilled in the art know the category of the inventive concepts.

The invention claimed is:

1. A filler metal for Tungsten Inert Gas (TIG) welding, of which a cross-section of the filler metal has a concavely curved shape,
wherein a concavely curved surface of the filler metal is determined by a curve connecting normal lines to plasma streamlines,
a shape f(r) of the plasma streamlines is defined by a following equation, $$f(r) = f(0)e^{-\left(\frac{r^2}{2\sigma^2}\right)}$$

where, r is a distance along a radius direction when an electrode is assumed to a center, f(0) is a vertical distance from the electrode to a base metal, and σ means variance, a value of the σ is selected in accordance with the distance along the radius direction,
wherein one normal line to the plasma streamlines is obtained at a cross point with the normal lines of an adjacent plasma streamlines.

2. The filler metal of claim 1, wherein a width of the cross-section of the filler metal is in the range of 3 mm to 10 mm and a thickness of the cross-section of the filler metal is in the range of 0.3 mm to 1 mm.

3. The filler metal of claim 1, wherein the filler metal is formed of stainless steel.

4. The filler metal of claim 1, wherein the filler metal is formed of at least one selected from sus300 group, duplex sts2209 and super duplex.

5. A filler metal for Tungsten Inert Gas (TIG) welding that is based on an arc between a base metal and an electrode,
wherein a cross-section of the filler metal is in a shape of a plane board represented by width and thickness, the thickness of the central plane board is thicker than that of the other plane board,
wherein the thickness of the central plane board is in the range of 1.1 to 2 times of the thickness of the other plane board.

6. A method for defining a cross-sectional shape of a filler metal for Tungsten Inert Gas (TIG) welding having a concavely curved shape,
Determining a concavely curved surface of the filler metal by connecting curve normal lines to plasma streamlines,
wherein a shape f(r) of the plasma streamlines is defined by a following equation, $$f(r) = f(0)e^{-\left(\frac{r^2}{2\sigma^2}\right)}$$

where, r is a distance along a radius direction when an electrode is assumed to a center, f(0) is a vertical distance from the electrode to a base metal, and σ means variance, a value of the σ is selected in accordance with the distance along the radius direction,
wherein one normal line to the plasma streamlines is obtained at a cross point with the normal lines of an adjacent plasma streamlines.

* * * * *